US012690594B2

(12) United States Patent (10) Patent No.: US 12,690,594 B2
Clidence et al. (45) Date of Patent: Jul. 28, 2026

(54) APPARATUS AND METHODS FOR DISSOLVING CARBON DIOXIDE IN WATER

(71) Applicant: ECO-OXYGEN TECHNOLOGIES, LLC, Indianapolis, IN (US)

(72) Inventors: David Clidence, Carmel, IN (US); Richard E. Speece, Nashville, TN (US)

(73) Assignee: ECO-OXYGEN TECHNOLOGIES, LLC, Indianapolis, IN (US)

( * ) Notice: Subject to any disclaimer, the term of this patent is extended or adjusted under 35 U.S.C. 154(b) by 418 days.

(21) Appl. No.: 18/463,926

(22) Filed: Sep. 8, 2023

(65) Prior Publication Data

US 2025/0081969 A1 Mar. 13, 2025

(51) Int. Cl.
 *A01N 59/04* (2006.01)
 *A01P 17/00* (2006.01)
 *C01B 32/50* (2017.01)
(52) U.S. Cl.
 CPC .............. *A01N 59/04* (2013.01); *A01P 17/00* (2021.08); *C01B 32/50* (2017.08)
(58) Field of Classification Search
 CPC ......... A01N 59/04; A01P 17/00; C01B 32/50; C02F 3/28; Y10S 210/931

USPC ...................... 210/603, 150, 151, 221.2, 931
See application file for complete search history.

(56) References Cited

U.S. PATENT DOCUMENTS

2015/0202579 A1* 7/2015 Richardson ......... B01F 25/3141
                                                            264/129

* cited by examiner

*Primary Examiner* — Madeline Gonzalez
(74) *Attorney, Agent, or Firm* — INNOVATION CAPITAL LAW; Vic Lin

(57) ABSTRACT

Systems for dissolving $CO_2$ into a liquid can be used in various applications. One of the challenges with incorporating $CO_2$ as a treatment strategy is the footprint needed for a basin large enough to use traditional diffuser type technology to dissolve the $CO_2$ at a relative low efficiency. A conical shaped transfer device can be used easily be used on a piping or closed system. The system operates by pumping a side stream of water through a conical shaped gas transfer reactor, such as a Speece Cone, where gaseous $CO_2$ is fed into the cone and broken up into an intense bubble swarm by the velocity of the inlet water. The cone shape design slows the water velocity down to where the buoyant rise velocity of the bubbles is higher than the water velocity which suspends the bubbles inside the cone, providing sufficient contact time for the $CO_2$ to dissolve.

16 Claims, 2 Drawing Sheets

APPARATUS AND METHODS FOR DISSOLVING CARBON DIOXIDE IN WATER

BACKGROUND OF THE INVENTION

1. Field of the Invention

Embodiments of the invention relate generally to water treatment systems and methods. More particularly, embodiments of the invention relate to apparatus for dissolving carbon dioxide ($CO_2$) in water and methods for using a liquid flow having $CO_2$ dissolved therein.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Invasive species including Asian carp and zebra and quagga mussels have become prolific throughout the waters of the United States. Invasive carp cause serious damage to native fish populations in the lakes and rivers that they infest because they out-compete native fish for food and habitat. Carp also lower the water quality, which can kill off sensitive organisms like native freshwater mussels. Invasive zebra and quagga mussels pose a serious threat to water distribution infrastructure causing macrofouling that impact the operations and maintenance of water distribution infrastructure including hydropower generation. Traditional treatment to control invasive species is either expensive or has harmful environmental by products, thus, there is a need for economical and environmentally safe control strategies for these invasive species.

Lime softening is a type of water treatment used for water softening which uses the addition of aqueous calcium hydroxide (limewater) to remove hardness by precipitation. As lime, in the form of limewater, is added to raw water, the pH is raised and the equilibrium of carbonate species in the water is shifted. Dissolved $CO_2$ is changed into bicarbonate $HCO^{-3}$ and then carbonate $CO_2^{-3}$. This action causes calcium carbonate to precipitate due to exceeding the solubility product. After removal of the precipitate, the resulting water typically has a basic pH that is subject to acidification.

Since the Industrial Revolution, the concentration of carbon dioxide in the atmosphere has increased from 280 ppm to 420 ppm. This concentration of $CO_2$ and other greenhouse gases in the air causes the climate change impacts being experienced today, from forest fires to stifling heat waves and damaging sea level rise. The global community is working to reverse this course in a number of ways.

The primary objective is to reduce carbon emissions by, for example, ramping up renewable energy, boosting energy efficiency and stopping deforestation. However, reduced emissions are not enough. To keep global temperature-rise to less than 1.5 Centigrade degree, which scientists say is necessary for preventing the worst impacts of climate change, there is a need to not only reduce emissions, but also remove and store some carbon that's already in the atmosphere. Carbon dioxide removal (or "carbon removal") aims to help mitigate climate change by removing carbon dioxide pollution both from emission sources as well as directly from the atmosphere. Carbon removal strategies include technologies to remove carbon dioxide from emission sources and more novel technologies like direct air capture, which scrubs $CO_2$ from the air, dissolves the $CO_2$ into water and sequester it underground.

In view of the foregoing, there is a need for improved methods and apparatus for dissolving $CO_2$ into a liquid and novel ways to use the resulting liquid.

SUMMARY OF THE INVENTION

Embodiments of the present invention provide a method for increasing a concentration of carbon dioxide in water comprising passing the water through a conical tubular apparatus, the conical tubular apparatus having a water inlet at a top end thereof and a water outlet at a bottom end thereof, the top end being the narrow most portion of the conical tubular apparatus; introducing carbon dioxide into the conical tubular apparatus adjacent the top end; and flowing the water through the conical tubular member to dissolve the carbon dioxide into the water as a carbon dioxide enhanced outflow.

Embodiments of the present invention further provide a method for prevention of fouling of pipes comprising passing the water through a conical tubular apparatus, the conical tubular apparatus having a water inlet at a top end thereof and a water outlet at a bottom end thereof, the top end being the narrow most portion of the conical tubular apparatus; introducing carbon dioxide into the conical tubular apparatus adjacent the top end; flowing the water through the conical tubular member to dissolve the carbon dioxide into the water as a carbon dioxide enhanced outflow; and passing the carbon dioxide enhanced outflow through the pipes.

Embodiments of the present invention also provide a method for reducing an amount of carbon dioxide in the atmosphere comprising scrubbing air to remove a carbon dioxide volume therefrom; passing the water through a conical tubular apparatus, the conical tubular apparatus having a water inlet at a top end thereof and a water outlet at a bottom end thereof, the top end being the narrow most portion of the conical tubular apparatus; introducing a carbon dioxide volume into the conical tubular apparatus adjacent the top end; flowing the water through the conical tubular member to dissolve the carbon dioxide into the water as a carbon dioxide enhanced outflow; and sequestering the carbon dioxide enhanced outflow into an injection well.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
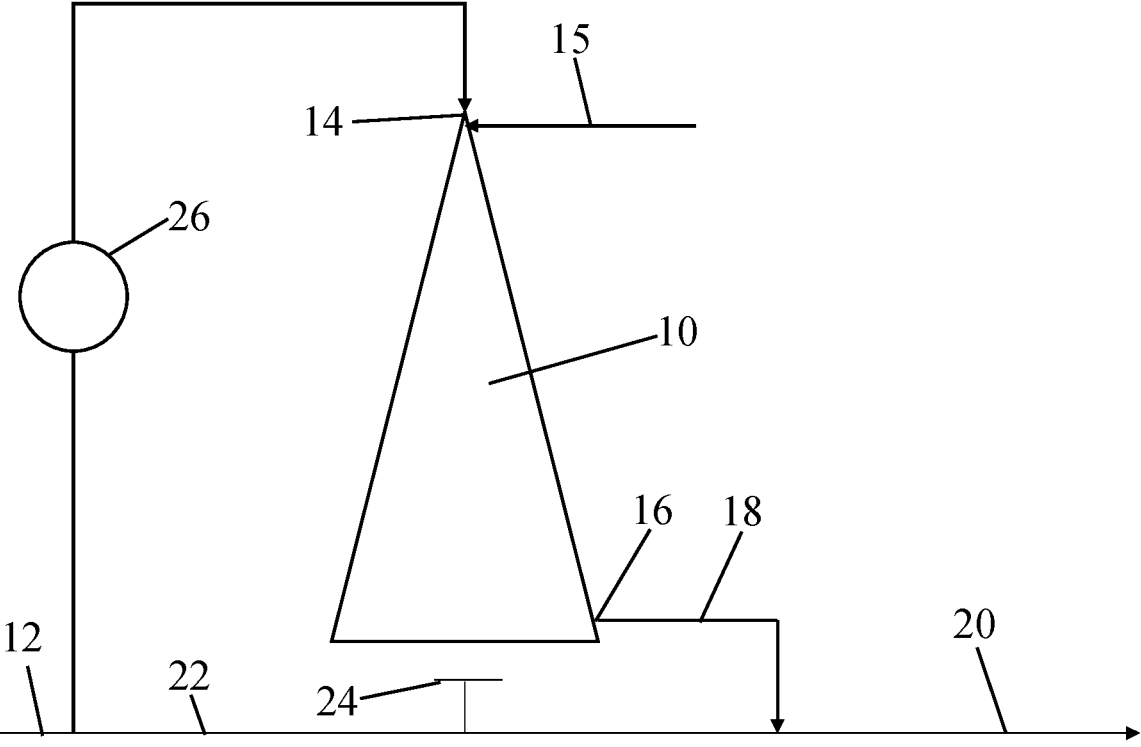
FIG. 1 illustrates a system for dissolving carbon dioxide into a closed water system, according to an exemplary embodiment of the present invention.

Unless otherwise indicated illustrations in the figures are not necessarily drawn to scale.

The invention and its various embodiments can now be better understood by turning to the following detailed description wherein illustrated embodiments are described.

It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide systems for dissolving carbon dioxide into a liquid, such as water, and methods for using such a carbon dioxide concentration-enhanced liquid. One of the challenges with incorporating $CO_2$ as a treatment strategy is the footprint needed for a basin large enough to use traditional diffuser type technology to dissolve the $CO_2$. This coupled with the low $CO_2$ transfer efficiency of traditional bubble diffusers makes a conical shaped carbon dioxide transfer device, such as a Speece Cone, an attractive alternative with its small footprint and high transfer efficiency. The conical shaped transfer device is a side stream or full stream treatment apparatus that can easily be used on a piping or closed system. The system operates by pumping a side stream or full stream of water through a conical shaped gas transfer reactor where gaseous $CO_2$ is fed into the cone and broken up into an intense bubble swarm by the velocity of the inlet water. The cone shape design slows the water velocity down to where the buoyant rise velocity of the bubbles is higher than the water velocity which suspends the bubbles inside the cone, providing sufficient contact time for the $CO_2$ to fully dissolve in the water. The cone achieves an average gas transfer efficiency of ≥95%.

As used herein, the term "water" represents an aqueous solution or mixture containing water. Such a solution can include pure water, water with dissolved molecules or ions, and water with undissolved solids present. The term "fluid" may also be used interchangeably to be a liquid that includes water.

Referring to FIG. 1, a conical shaped transfer device 10, or simply cone 10, can be fed water from an incoming flow 12 at a top end 14 of the cone 10, where the top end is the narrow most end of the cone 10. Carbon dioxide can be injected via gas line 15 at the top end 14 of the cone 10, where the flow of water creates bubbles of the injected carbon dioxide.

As the water flows through the cone 10, its velocity slows due to the enlarging diameter of the cone 10. An outlet 16, at the bottom of the cone 10, can provide a flow 18 to continue to its destination via outgoing flow 20.

In some embodiments, a bypass pipe 22 can be provided to connect the incoming flow 12 to the outgoing flow 20. A valve 24 can be used to control flow of liquid through the bypass pipe 22. The bypass pipe may be used to provide a lower carbon dioxide concentration to the outgoing flow 20, for example.

In some embodiments, a flow metering pump 26 may be used to control the flow at the inlet 14 of the cone 10. The pump 26 may be useful, for example, when the volume moving through the incoming flow 12 may vary. Thus, the pump 26 can ensure that the flow through the cone 10 is correct to permit proper use thereof, as described in greater detail below.

The system of FIG. 1 can provide an outflow with an increased concentration of dissolved carbon dioxide. The water having the increased concentration of carbon dioxide may be useful in several different processes, as described below.

As discussed above, invasive carp cause serious damage to native fish populations in the lakes and rivers that they infest because they out-compete native fish for food and habitat. Invasive carp also lower the water quality, which can kill off sensitive organisms like native freshwater mussels. Invasive zebra and quagga mussels pose a serious threat to water distribution infrastructure causing macrofouling that impact the operations and maintenance of water distribution infrastructure including hydropower generation. Traditional treatment to control invasive species is either expensive or has harmful environmental by products, thus, aspects of the present invention can be used to prevent Asian carp migration in a water body by dissolving $CO_2$ into a section of the water body to raise the $CO_2$ level so the Asian carp can't breath and, therefore, do not swim through this "high dissolved $CO_2$" zone.

Further, laboratory and field studies using carbon dioxide have successfully cause mortality and a reduction in the rate of veliger byssogenesis (settlement and colonization).

One of the challenges with incorporating $CO_2$ as a treatment strategy is that the majority of the problems associated with dreissenid mussel fouling occur within a piping system or other closed system. This makes it near impossible to use traditional diffuser type technology to dissolve the $CO_2$. A Speece Cone, such as cone 10, described above, is a side stream or full stream treatment technology and can easily be used on a piping or closed system. The technology of the cone 10 is based on Henry's Law and works by trapping pure $CO_2$ bubbles inside the cone until they are dissolved. The system operates by pumping a side stream or full stream of water through a conical shaped gas transfer reactor (cone 10). Gaseous $CO_2$ is fed into the cone and broken up into an intense bubble swarm by the velocity of the inlet water. The shape of the cone 10 slows the water velocity down to where the buoyant rise velocity of the bubbles is higher than the water velocity through the cone 10, which suspends the bubbles inside the cone 10, providing sufficient contact time for the $CO_2$ to fully dissolve in the water. As mentioned above, the cone 10 can achieve an average gas transfer efficiency of ≥95%.

The lime softening processes for drinking water include a step for pH adjustment, after settling. Gaseous carbon dioxide is a simple and affordable alternative to acid, but it is often used inefficiently, which wastes $CO_2$ gas, requires too much energy, or requires finished water for the carrier stream.

The cone 10, described above, provides a highly efficient solution for rapidly dissolving $CO_2$ into a process water stream for effective pH control. The cone 10 is unique in that, for example, there is no fouling due to clogging and minimal maintenance. The cone 10 can be used as an in-line process that has a small footprint and minimal loss of pressure. The cone 10 is further suitable for high flows and high solids.

As discussed above, the concentration of carbon dioxide in the atmosphere has been on the rise, leading to the climate change impacts we're experiencing today, from forest fires to stifling heat waves and damaging sea level rise.

To keep global temperature-rise to less than 1.5 Centigrade degrees, which scientists say is necessary for preventing the worst impacts of climate change, there is a need to not only reduce emissions but also remove and store some carbon that's already in the atmosphere. Carbon dioxide removal (or "carbon removal") aims to help mitigate climate change by removing carbon dioxide pollution from emission sources or directly from the atmosphere. One removal process, direct air capture, can scrub carbon dioxide from the air, but there is a need to then store such removed carbon dioxide without releasing it back to the atmosphere.

The cone 10 can provide a highly efficient method for rapidly dissolving a high purity $CO_2$ gas into a pressurized water injection well for sequestration. Paired with rapidly advancing technology for direct air capture, and the appropriate geological formation, the cone 10 can provide the unique mass-transfer solution critical for this innovative method to combat climate change.

Figure 2:
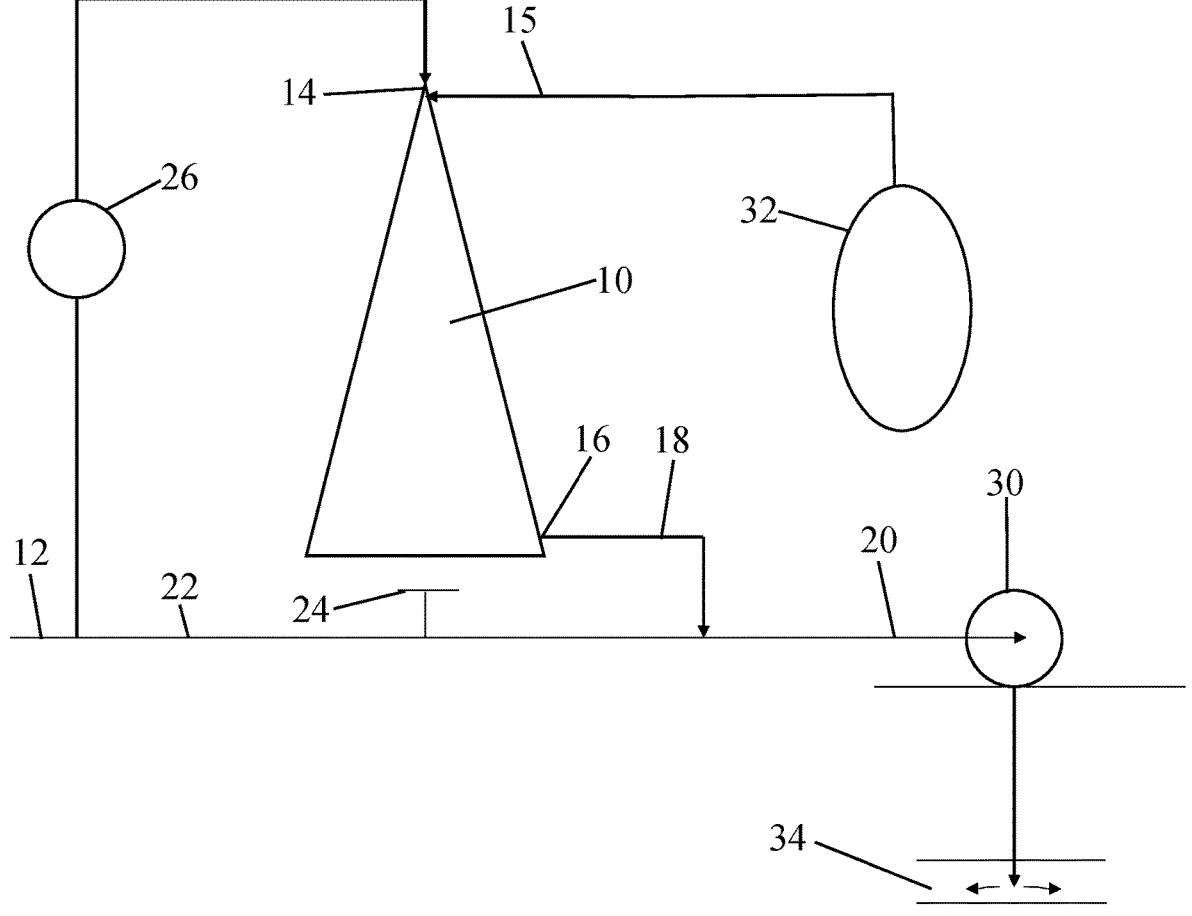
FIG. 2 illustrates a system for sequestering carbon dioxide into an injection well, according to an exemplary embodiment of the present invention.

Referring to FIG. 2, in some embodiments, the outgoing flow 20 may be pumped, via pump 30, for example, into a sequestration injection well 34, such as a Class VI well designed to sequester carbon dioxide. The carbon dioxide used for injection into the cone 10 may be, for example, taken from the air via a direct air capture device 32, adapted to capture carbon dioxide from air to provide a pure or highly concentrated carbon dioxide flow into the cone 10.

In some embodiments, the carbon dioxide enhanced outflow from the cone 10 can be passed through the cone 10 (or another similar cone) to further increase the concentration of carbon dioxide in the water prior to sequestering the water in an injection well.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

7

8

What is claimed is:

1. A method for increasing a concentration of carbon dioxide in water, comprising:

passing the water through a conical tubular apparatus, the conical tubular apparatus having a water inlet at a top end thereof and a water outlet at a bottom end thereof, the top end being the narrow most portion of the conical tubular apparatus, wherein a velocity of the water, as it passes through the conical tubular apparatus from the top end to the water outlet, slows, wherein a cross-sectional inside diameter of the conical tubular apparatus continually increases from the top end to the bottom end thereof;

introducing carbon dioxide into the conical tubular apparatus adjacent the top end; and flowing the water through the conical tubular apparatus to dissolve the carbon dioxide into the water as a carbon dioxide enhanced outflow, wherein a buoyant rise velocity of bubbles of carbon dioxide is greater than the velocity of the water through the cone, suspending the bubbles inside the cone.

2. The method of claim 1, wherein the water inlet and the water outlet are part of a closed system.

3. The method of claim 1, further comprising passing the carbon dioxide enhanced outflow through a pipe to act as a molluscicide for control of dreissenid mussels.

4. The method of claim 3, wherein the pipe is part of a hydropower generation and water delivery infrastructure.

5. The method of claim 3, wherein the dreissenid mussels include zebra and quagga mussels or any other invasive or undesirable aquatic organisms.

6. The method of claim 1, further comprising passing the carbon dioxide enhanced outflow through a pipe to cause mortality and reduce in a rate of veliger byssogenesis of dreissenid mussels.

7. The method of claim 1, further comprising adjusting a pH of a water sample by adding the carbon dioxide enhanced outflow thereto.

8. The method of claim 7, wherein the water sample is water from a lime softening process after settling of a precipitate.

9. The method of claim 1, further comprising sequestering the carbon dioxide enhanced outflow into an injection well for storage.

10. The method of claim 1, further comprising introducing the carbon dioxide enhanced outflow into a portion of a body of water to prevent or inhibit migration of Asian carp or any other invasive or undesirable aquatic organisms therethrough.

11. A method for prevention of fouling of pipes, comprising:

passing the water through a conical tubular apparatus, the conical tubular apparatus having a water inlet at a top end thereof and a water outlet at a bottom end thereof, the top end being the narrow most portion of the conical tubular apparatus, wherein a velocity of the water, as it passes through the conical tubular apparatus from the top end to the water outlet, slows, wherein a cross-sectional inside diameter of the conical tubular apparatus continually increases from the top end to the bottom end thereof;

introducing carbon dioxide into the conical tubular apparatus adjacent the top end;

flowing the water through the conical tubular member to dissolve the carbon dioxide into the water as a carbon dioxide enhanced outflow, wherein a buoyant rise velocity of bubbles of carbon dioxide is greater than the velocity of the water through the cone, suspending the bubbles inside the cone; and passing the carbon dioxide enhanced outflow through the pipes.

12. The method of claim 11, wherein the water inlet, the water outlet and the pipes are part of a closed system.

13. The method of claim 11, wherein the carbon dioxide enhanced outflow acts as a molluscicide for control of dreissenid mussels in the pipes.

14. The method of claim 13, wherein the pipes are part of a hydropower generation and water delivery infrastructure.

15. A method for reducing an amount of carbon dioxide in the atmosphere, comprising:

scrubbing air to remove a carbon dioxide volume therefrom;

passing the water through a conical tubular apparatus, the conical tubular apparatus having a water inlet at a top end thereof and a water outlet at a bottom end thereof, the top end being the narrow most portion of the conical tubular apparatus, wherein a velocity of the water, as it passes through the conical tubular apparatus from the top end to the water outlet, slows, wherein a cross-sectional inside diameter of the conical tubular apparatus continually increases from the top end to the bottom end thereof;

introducing a carbon dioxide volume into the conical tubular apparatus adjacent the top end;

flowing the water through the conical tubular member to dissolve the carbon dioxide into the water as a carbon dioxide enhanced outflow, wherein a buoyant rise velocity of bubbles of carbon dioxide is greater than the velocity of the water through the cone, suspending the bubbles inside the cone; and sequestering the carbon dioxide enhanced outflow into an injection well.

16. The method of claim 15, further comprising passing the carbon dioxide enhanced outflow into the conical tubular apparatus to further increase a concentration of carbon dioxide in the water.

* * * * *